Sept. 2, 1952 E. G. OTIS ET AL 2,609,449
CAVITY RESONATOR
Filed March 4, 1946
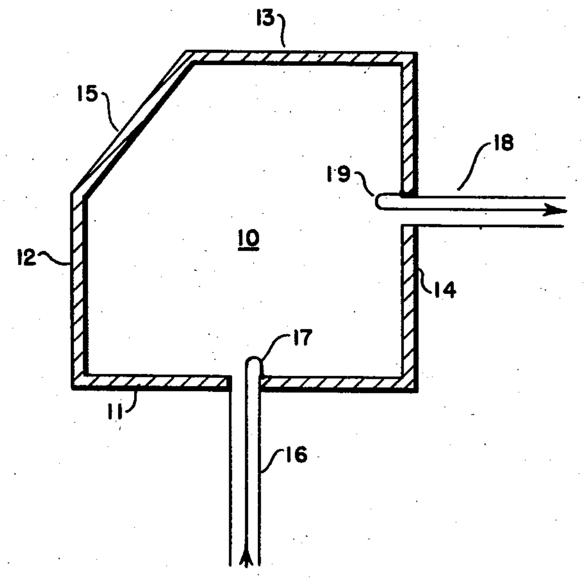
INVENTORS
ELEANOR G. OTIS
WINFIELD W. SALISBURY
BY
William D. Hall
ATTORNEY Patented Sept. 2, 1952 2,609,449

UNITED STATES PATENT OFFICE 2,609,449

CAVITY RESONATOR

Eleanor G. Otis, Bradford, Mass., and Winfield W. Salisbury, Cedar Rapids, Iowa, assignors to the United States of America as represented by the Secretary of War Application March 4, 1946, Serial No. 651,938

3 Claims. (Cl. 178—44)

This invention relates generally to electrical apparatus and more particularly to a device for distorting the radio frequency spectrum of a pulse signal such that the shape of the pulse is modified and its duration is increased.

A signal consisting of a series of square radio frequency (R.-F.) pulses is defined by the duration of each pulse and the interval between successive pulses. The reciprocal of the interval between successive pulses will hereinafter be referred to as the pulse repetition frequency (PRF) of the signal.

For purposes of mathematical analysis, a series of square radio frequency pulses comprises a frequency spectrum which includes a carrier frequency component plus many side band frequency components above and below the carrier frequency. The pulse duration is determined primarily by the amplitude of the various side band frequencies and the PRF is related to the total number of side band frequencies. One object of the present invention is to provide a device for expanding the duration of a radio frequency pulse.

Certain radio frequency oscillators are adapted to generate a series of R.-F. pulses of a short duration. Between successive R.-F. pulses the R.-F. oscillator is rendered inoperative. The ratio of the interval during which the R.-F. oscillator is generating a pulse to the interval between pulses is defined as the duty cycle of the oscillator. Stated alternatively the duty cycle is the ratio between the pulse duration of the series of pulses to the reciprocal of the PRF of the series.

Certain R.-F. oscillators of the magnetron type are adapted to generate a series of R.-F. pulses of very short duration in relation to the PRF, that is, such magnetrons have a low duty cycle. It is sometimes desirable to use a magnetron having a low duty cycle to generate a series of R.-F. pulses and to increase the duty cycle by expanding the pulse duration. It is intended that a pulse expander embodying the principles of this invention be adapted for use with such a magnetron or any other R.-F. oscillator having a low duty cycle. It is further intended that the pulse expander embodying the principles of this invention be adapted for use in any application wherein the duration of a radio frequency pulse is to be increased.

Further objects, features and advantages of this invention will suggest themselves to those skilled in the art and will become apparent from the following description of the invention taken in connection with the accompanying diagrammatic, cross-sectional view of a pulse expanding device embodying the principles of this invention.

In the embodiment shown in the figure a cubical enclosure 10 has a modified corner as shown to form a polyhedron. Enclosure 10 includes five conducting walls 11, 12, 13, 14 and 15 joined to form an enclosed space. Succeeding walls are joined at right angles to each other with the exception of walls 12, 15, and 13. While wall 12 is placed at right angles with respect to wall 13, the two are joined together by wall 15 which is placed at an angle with respect to both. Two end walls, not shown in the figure, are joined to the aforementioned walls to form a non-symmetrical enclosure.

The input to the device is applied to coaxial cable 16, the outer conductor of which is attached to wall 11. The center conductor of coaxial cable 16 projects into the enclosure 10, is bent back, and is attached to the inner surface of wall 11 to form a loop probe 17.

The output of the device is taken from coaxial cable 18, the outer conductor of which is attached to wall 14. The center conductor of coaxial conductor 18 projects into enclosure 10, is bent back, and is attached to the inner surface of wall 14 to form a loop probe 19.

The dimensions of enclosure 10 are greater than the wavelength of the fundamental frequency of the series of input pulses, the reason for this being explained presently.

The R.-F. pulse energy coupled into enclosure 10, as mentioned beforehand, contains a carrier frequency component and many sideband frequency components. Due to the unsymmetrical shape of the enclosure and because the internal dimensions are large compared to the wavelength of the carrier frequency, several resonant modes of oscillation are excited by some of the sideband frequency components. In addition, the roughly cubical shape decreases the ratio of the wall surface area to the volume and increases the "Q" of the enclosure for the sideband frequencies producing resonance. This follows since the "Q" of an enclosure of the type shown is proportional to the ratio of the volume to the wall surface of the enclosure.

Some of the sideband frequency components of the input pulse are reinforced by the resonances within the enclosure while others may be suppressed to some extent. The output pulse is then a modification of the input pulse. The modification will, in part, be governed by the position, orientation, and size of input probe 17, since the number and type of resonant modes excited within the enclosure are dependent upon these parameters. The modification will also be governed by the position, orientation, and size of output probe 19 since these parameters govern the amount of energy extracted from the various resonant modes.

Radio frequency energy extracted from the enclosure in the form of pulses will now contain various sideband frequency components which have been greatly reinforced. The input pulse is therefore distorted in shape and expanded in duration in passing through the enclosure. The amount and character of the distortion will, as mentioned beforehand, be determined by the position of the input and output loop probes. The shape of the output pulse may thus be varied both in duration and shape.

The shape of the enclosure 10 illustrated herein is exemplary only. It is obvious that any enclosure of arbitrary shape which is large enough to excite resonant modes of the various sideband frequency components of the input pulse may prove applicable. It is also self-evident that the position of the input and the output loop probes may be adjusted to suit particular needs.

The method of feeding the radio frequency signal into the enclosure 10 and extracting the output radio frequency signal enables the device to be conveniently coupled to a variety of radio frequency devices whose pulse output is to be increased in duration.

While there has been described a selected embodiment of this invention, it will be obvious to those skilled in the art that various changes and modifications may be made therein without departing from the scope of the invention.

The invention claimed is:

1. A high frequency cavity resonator for modulated carrier energy comprising a hollow, closed, electrically conducting surface in the form of a cube except that two of its sides are intersected by an additional side forming angles other than 90° at the points of intersection, the internal dimensions of said resonator being large compared to the wavelength of said energy, whereby said cavity resonator is resonantly responsive to a plurality of side band frequencies of energy exciting said cavity resonator.

2. A high frequency cavity resonator comprising a hollow, closed, non-reentrant, electrically conducting surface in the form of a cube except that two of its sides are intersected by an additional side forming angles other than 90° at the intersections with said two sides, an input and an output coupling means connected to said cube for exciting said resonator and extracting energy therefrom, all dimensions of said resonator being many times larger than the wave length of said energy, whereby said cavity resonator is resonantly responsive to a plurality of side band frequencies of the energy exciting said cavity resonator.

3. A high frequency cavity resonator as defined in claim 2, wherein said input and output coupling means extend through two adjacent sides of said cube, respectively, said adjacent sides being disposed opposite and symmetrically with respect to said additional side.

ELEANOR G. OTIS.
WINFIELD W. SALISBURY.

REFERENCES CITED

The following references are of record in the file of this patent:

UNITED STATES PATENTS

| Number | Name | Date |
|---|---|---|
| 2,227,372 | Webster | Dec. 31, 1940 |
| 2,357,314 | Carter | Sept. 5, 1944 |
| 2,473,777 | Beechlyn | June 21, 1949 |
| 2,518,383 | Schelkunoff | Aug. 8, 1950 |